(12) United States Patent
Oh

(10) Patent No.: US 7,929,062 B2
(45) Date of Patent: Apr. 19, 2011

(54) CHANNEL SCANNING METHOD OF DIGITAL BROADCAST RECEIVER HAVING A PLURALITY OF TUNERS

(75) Inventor: Keum-yong Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 11/228,346

(22) Filed: Sep. 19, 2005

(65) Prior Publication Data

US 2006/0061694 A1   Mar. 23, 2006

(30) Foreign Application Priority Data

Sep. 23, 2004 (KR) .................. 10-2004-0076517

(51) Int. Cl.
*H04N 5/50* (2006.01)
*H04N 5/44* (2006.01)
*H04N 5/46* (2006.01)

(52) U.S. Cl. ........ 348/732; 348/555; 348/558; 348/725; 348/731

(58) Field of Classification Search .................. 348/555, 348/556, 558, 725, 731, 732; 725/85, 131, 725/138
See application file for complete search history.

(56) References Cited

U.S. PATENT DOCUMENTS

| | | | | |
|---|---|---|---|---|
| 5,933,192 A * | 8/1999 | Crosby et al. | ............ | 375/240.25 |
| 6,137,546 A * | 10/2000 | Shintani et al. | ............... | 348/731 |
| 6,188,448 B1 * | 2/2001 | Pauley et al. | ................. | 348/731 |
| 6,334,217 B1 * | 12/2001 | Kim | ................................. | 725/38 |
| 6,377,316 B1 * | 4/2002 | Mycynek et al. | ............. | 348/731 |
| 6,483,553 B1 * | 11/2002 | Jung | ............................. | 348/731 |
| 6,486,925 B1 * | 11/2002 | Ko | .................................. | 348/731 |
| 6,519,011 B1 * | 2/2003 | Shendar | ........................ | 348/731 |
| 6,538,704 B1 * | 3/2003 | Grabb et al. | .................. | 348/731 |
| 6,542,203 B1 * | 4/2003 | Shadwell et al. | ............. | 348/726 |
| 6,630,964 B2 * | 10/2003 | Burns et al. | .................... | 348/554 |
| 6,704,060 B2 * | 3/2004 | Levandowski | ................ | 348/725 |
| 6,714,264 B1 * | 3/2004 | Kempisty | ...................... | 348/732 |
| 6,721,018 B1 * | 4/2004 | Shintani et al. | ............... | 348/731 |
| 6,757,029 B2 * | 6/2004 | Kurihara | ........................ | 348/731 |
| 6,804,824 B1 * | 10/2004 | Potrebic et al. | ................ | 725/38 |
| 6,897,904 B2 * | 5/2005 | Potrebic et al. | ............... | 348/731 |
| 6,927,806 B2 * | 8/2005 | Chan | ............................. | 348/731 |
| 7,027,108 B2 * | 4/2006 | Kim | ............................... | 348/732 |
| 7,053,964 B2 * | 5/2006 | Moon | ............................. | 348/731 |
| 7,086,076 B1 * | 8/2006 | Park | ................................. | 725/50 |
| 7,100,194 B1 * | 8/2006 | Unger | ........................... | 725/151 |
| 7,113,230 B1 * | 9/2006 | Genovese et al. | ............. | 348/731 |
| 7,158,190 B2 * | 1/2007 | Ikeguchi | ........................ | 348/731 |
| 7,215,382 B2 * | 5/2007 | Bennett | ......................... | 348/570 |
| 7,215,385 B2 * | 5/2007 | Onomatsu | ..................... | 348/731 |
| 7,250,987 B2 * | 7/2007 | Goyal et al. | .................. | 348/725 |

(Continued)

FOREIGN PATENT DOCUMENTS

KR    1998-044359 A    9/1998

(Continued)

*Primary Examiner* — Brian Yenke
(74) *Attorney, Agent, or Firm* — Sughrue Mion, PLLC

(57) ABSTRACT

A channel scanning method is provided that is performed by a digital broadcast receiver having a plurality of tuners. The channel scanning method includes determining whether channel data exists in a channel, and if channel data exists in the channel, storing information regarding the channel obtained by parsing the channel data, and moving ahead by a number of channels corresponding to the number of tuners included in the digital broadcast receiver.

9 Claims, 10 Drawing Sheets

U.S. PATENT DOCUMENTS

| | | | |
|---|---|---|---|
| 7,277,137 B2 * | 10/2007 | Potrebic et al. | 348/731 |
| 2002/0057367 A1 | 5/2002 | Baldock | |
| 2002/0057380 A1 | 5/2002 | Matey | |
| 2002/0067437 A1 * | 6/2002 | Tsubouchi et al. | 348/725 |
| 2003/0196211 A1 * | 10/2003 | Chan | 725/131 |
| 2004/0036811 A1 * | 2/2004 | Ikeguchi | 348/732 |
| 2005/0044570 A1 * | 2/2005 | Poslinski | 725/48 |
| 2005/0144651 A1 * | 6/2005 | Prus et al. | 725/134 |
| 2006/0035610 A1 * | 2/2006 | Potrebic | 455/178.1 |
| 2007/0118382 A1 * | 5/2007 | Kuboyama et al. | 704/275 |

FOREIGN PATENT DOCUMENTS

| | | |
|---|---|---|
| KR | 1999-0042493 A | 6/1999 |
| KR | 2002-0018604 A | 3/2002 |

* cited by examiner

CHANNEL SCANNING METHOD OF DIGITAL BROADCAST RECEIVER HAVING A PLURALITY OF TUNERS

CROSS-REFERENCE TO RELATED APPLICATION

This application claims priority from Korean Patent Application No. 10-2004-0076517 filed on Sep. 23, 2004 in the Korean Intellectual Property Office, the disclosure of which is incorporated herein by reference in its entirety.

BACKGROUND OF THE INVENTION

1. Field of the Invention

The present invention relates to a digital broadcast receiver, and more particularly, to a channel scanning method in which channel scanning is efficiently carried out in a digital broadcast receiver having a plurality of tuners.

2. Description of the Related Art

A digital broadcast receiver is an apparatus that restores original digital data from a transmitted broadcast signal according to a digital transmission scheme. A digital broadcast transmitter (i.e., a broadcast station area, hereinafter, referred to as a head end) converts an analog signal into a digital signal comprised of 0s and 1s using digital technology, compresses the converted signal together with other information, and then transmits the compressed signal according to a digital transmission scheme. Then, the digital broadcast receiver receives and converts the transmitted signal into the original video and audio.

Compared to analog technology, digital technology is usually less effected by noise, needs less transmission power, allows for error correction, and suffers less degradation in transmission, copying, and storing. In addition, digital technology enables high band compression of an audio/video signal, and it facilitates searching, processing, and editing of information. Digital broadcasts are advantageous in that they are less effected by noise and can be efficiently transmitted compared to conventional analog TV broadcasts.

Currently, digital broadcast receiver programs provide a plurality of broadcast channels received from a variety of sources, such as terrestrial, satellite, and cable broadcasters. However, the number of broadcast channels provided by digital broadcast receivers is expected to increase considerably, thus making it more difficult for users to find out what broadcast channels are offered or what programs the input broadcast signals contain. Accordingly, various methods for helping users to select a channel efficiently or a broadcast program through an electronic program guide (EPG) or channel scanning have been suggested.

One of the various methods is a channel scanning method, which is also called an auto-programming method. In the channel scanning method, it is determined whether a broadcast signal exists in each of a plurality of channels constituting an entire range of channels provided by a tuner of a digital broadcast receiver by checking every channel. If a predetermined channel is determined to have a broadcast signal, information regarding the broadcast signal is stored in conjunction with the channel number. Otherwise, it is determined whether the next channel (particularly, a channel directly above the predetermined channel) has a broadcast signal.

Recently, digital broadcast receivers, which include a plurality of tuners or a plurality of pairs of tuners/demodulators to provide a picture-in-picture (PIP) function and a quick channel switch function, have been developed. In order to meet various demands of users, an increasing number of digital broadcast receivers are expected to be manufactured having a plurality of tuners.

To date, conventional digital broadcast receivers, however, scan channels using only one tuner at a time, even though they may include a plurality of tuners, and thus, they are not making full use of their capabilities. In view of the above, there is still a need to develop an efficient technique of scanning channels by simultaneously using a plurality of tuners in a digital broadcast receiver.

SUMMARY OF THE INVENTION

The present invention provides a channel scanning method in a digital broadcast receiver having a plurality of tuners, in which channel scanning is quickly and efficiently carried out using the plurality of tuners.

The present invention also provides a variety of channel scanning methods in a method of scanning channels using a plurality of tuners.

According to an exemplary aspect of the present invention, there is provided a channel scanning method performed by a tuner of a digital broadcast receiver having a plurality of tuners, the method including: determining whether channel data exists in a channel, if channel data exists in the channel, storing information regarding the channel obtained by parsing the channel data, and moving ahead by a number of channels corresponding to the number of tuners included in the digital broadcast receiver.

The determining whether channel data exists in the channel may include determining whether a program association table is detected from the channel within a predetermined amount of time.

The storing information may include extracting basic information regarding the channel by parsing the channel data, and storing the extracted basic information together with a serial number of the channel.

The information regarding the channel may comply with the Program and System Information Protocol (PSIP).

Additionally, it may be that none of the plurality of tuners performs the steps of determining, storing, and moving ahead while receiving a broadcast program being watched by a user.

According to another exemplary aspect of the present invention, there is provided a channel scanning method by a tuner of a digital broadcast receiver having a plurality of tuners, the method including: allocating a plurality of channel ranges to the plurality of tuners; determining whether channel data exists in one of a plurality of channels included in each of the channel ranges, parsing the channel data of the channels in which channel data is determined to exist, storing information regarding the channels in which the channel data is determined to exist wherein the information is obtained by parsing the channel data, and tuning the tuners to channels in the respective channel ranges subsequent to the channels in which the channel data is determined to exist.

The channel ranges may be allocated by equally dividing an entire range of channels received by the digital broadcast receiver by the number of tuners of the digital broadcast receiver.

According to still another exemplary aspect of the present invention, there is provided a channel scanning method performed by a tuner of a digital broadcast receiver having a plurality of tuners, the method including: determining whether channel data exists in a first channel by using a first tuners; if the first tuner determines that channel data does not exist in the first channel, tuning the first tuner to a channel subsequent to the first channel; and tuning a second tuner of the plurality of tuners to a channel subsequent to the first channel if channel data exists in the channel subsequent to the first channel.

According to yet another exemplary aspect of the present invention, there is provided a channel scanning method performed by a tuner of a digital broadcast receiver having a plurality of tuners, the method including: allocating a plurality of demodulation methods to the plurality of tuners; determining whether channel data exists in a channel by using each of the demodulation methods allocated to the tuners, if channel data is determined to exist in the channel, parsing the channel data of the channel in which channel data is determined to exist and storing information regarding the channel obtained by parsing the channel data; and tuning the tuners in to a channel subsequent to the channel.

The demodulation methods may be allocated to the tuners in consideration of how frequently each demodulation method is used.

If the same demodulation method is allocated to a plurality of tuners, one of the above channel scanning methods according to the present invention may be applied thereto.

BRIEF DESCRIPTION OF THE DRAWINGS

The above and other exemplary features and advantages of the present invention will become more apparent by describing in detail exemplary embodiments thereof with reference to the attached drawings, which are not intended to limit the invention in any way, in which.

DETAILED DESCRIPTION OF THE INVENTION

Figure 1:
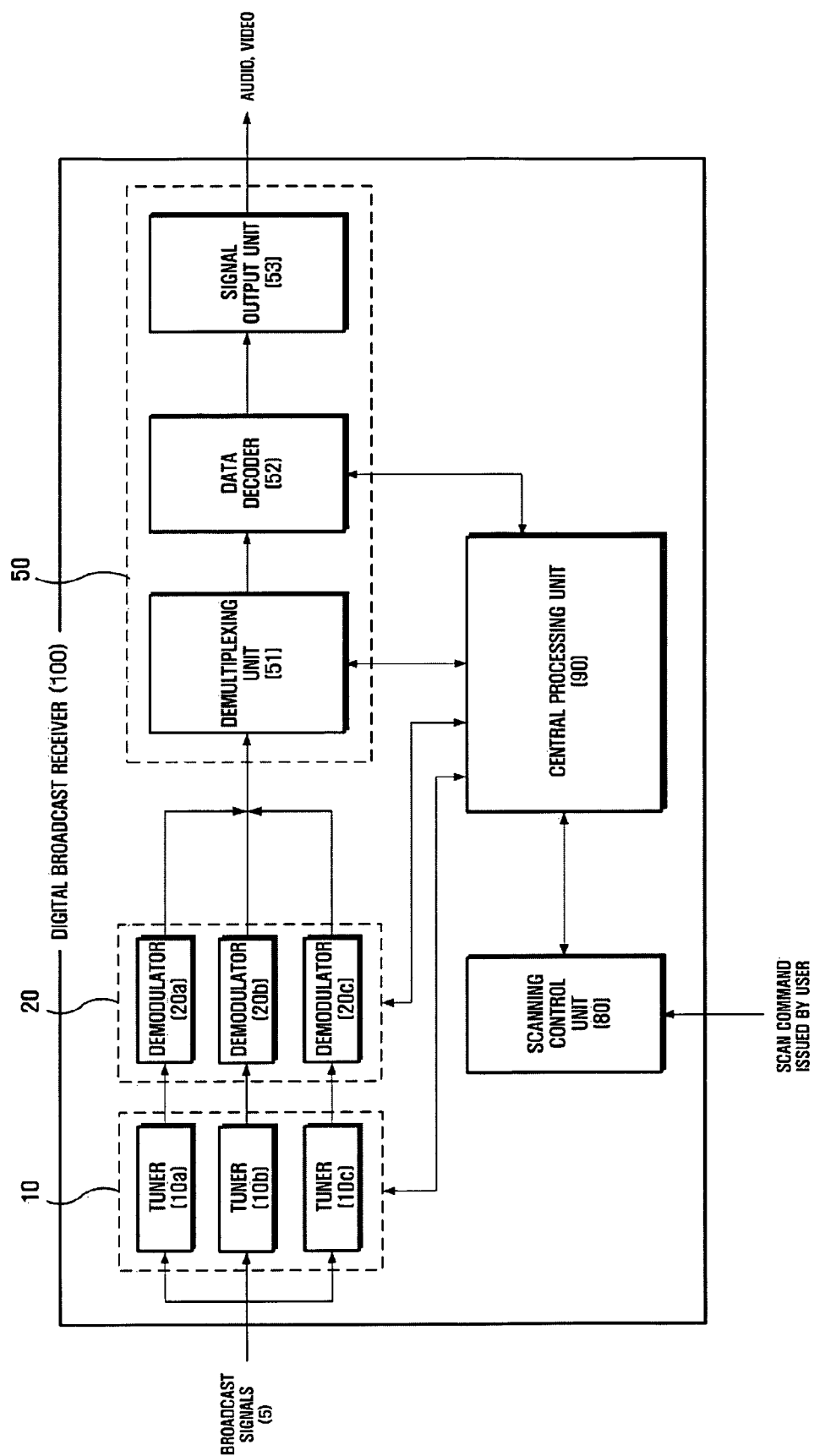
FIG. 1 is a block diagram of a digital broadcast receiver according to an exemplary embodiment of the present invention.

The present invention will now be described more fully with reference to the accompanying drawings, in which exemplary embodiments of the invention are shown. Exemplary advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Referring to FIG. 1, a digital broadcast receiver 100 includes a plurality of pairs of tuners and demodulators. In detail, the digital broadcast receiver 100 includes a tuner unit 10, which includes a plurality of tuners 10a, 10b, and 10c, and a demodulation unit 20, which includes a plurality of demodulators 20a, 20b, and 20c. In the present embodiment, the digital broadcast receiver 100 includes three pairs of tuners and demodulators. However, the present invention is applicable to a digital broadcast receiver having two or more pairs of tuners and demodulators.

The digital broadcast receiver 100 includes the tuner unit 10, the demodulation unit 20, a data retrieval unit 50, a central processing unit 90, and a scanning control unit 80.

Figure 2:
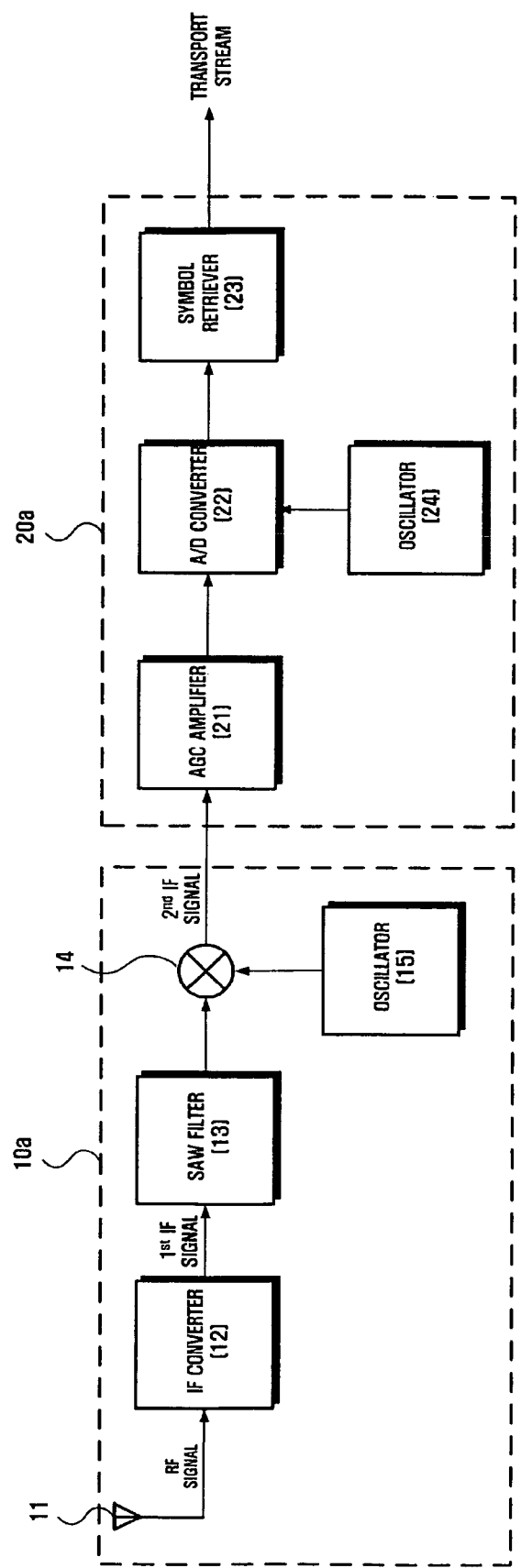
FIG. 2 is a detailed block diagram of an exemplary tuner/demodulator pair.

FIG. 2 illustrates an exemplary tuner/demodulator pair.

The tuner unit 10 includes the tuners 10a, 10b, and 10c. Each of the tuners 10a, 10b, and 10c receives a broadcast signal selected from a plurality of broadcast signals 5 transmitted by a user via a wired/wireless medium. For example, the tuner 10a may include a radio frequency (RF) antenna 11, which receives the broadcast signals 5, and an intermediate frequency (IF) converter 12, which selects one of the broadcast signals 5 of a channel of interest and converts the selected broadcast signal 5 into an IF signal. In a case where the digital broadcast receiver 100 receives a cable broadcast program, the RF antenna 11 of the tuner 10a may be replaced by a signal input terminal of a cable modem. In the present embodiment, a broadcast signal is input to the tuner 10a via the RF antenna 11, but the present invention is not restricted to this configuration.

The tuner 10a provides the IF signal to the demodulation unit 20. Then, the demodulation unit 20a corresponding to the tuner 10a retrieves a transport stream from the IF signal and provides the transport stream to the data retrieval unit 50.

The operations of the tuner 10a and the demodulation unit 20a will now be described in further detail with reference to FIG. 2. Referring to FIG. 2, the tuner 10a includes the RF antenna 11, the IF converter 12, a surface acoustic wave (SAW) filter 13, a mixer 14, and a first oscillator 15.

The IF converter 12 of the tuner 10a converts an RF signal, e.g., a signal having a frequency of 50-860 MHz, into a first IF signal, e.g., a signal having a frequency of 44 MHz, and it provides the first IF signal to the SAW filter 13.

The SAW filter 13 removes noise and broadcast signals of channels adjacent to the channel of the first IF signal from the first IF signal and outputs the first IF signal to the mixer 14.

The first oscillator 15 generates an oscillation frequency used to generate a second IF signal. Then, the mixer 14 converts the signal output by the SAW filter 13 into a second IF signal by down-converting the frequency of the first IF signal output by the SAW filter 13 to the oscillation frequency. Thereafter, the mixer 14 outputs the second IF signal to the demodulator 20a.

The demodulator 20a includes an automatic gain control (AGC) amplifier 21, an analog-to-digital (A/D) converter 22, a symbol retriever 23, and a second oscillator 24.

The AGC amplifier 21 compensates for the gain of the demodulator 20a. In other words, since the signal output by the SAW filter 13 is weak, the AGC amplifier 21 amplifies the signal to a predetermined level, and then it can be converted to a digital signal by the A/D converter 22.

The second oscillator 24 generates a sampling frequency used to sample the second IF signal. The A/D converter 22 converts the amplified signal into a digital signal having the sampling frequency generated by the second oscillator 24, and then outputs the digital signal to the symbol retriever 23.

The symbol retriever 23 retrieves original symbols (hereinafter referred to as "transmission symbols") transmitted by a broadcasting system from the digital signal output by the A/D converter 22 using a demodulation method selected by the scanning control unit 80 (for example, VSB-8, VSB-16, QAM64, QAM256, QAM1024, DPSK, or QPSK). A terrestrial broadcasting system or a cable broadcasting system may use a VSB demodulation method such as VSB-8 or VSB-16, or a QAM demodulation method such as QAM64, QAM256, or QAM1024, to transmit digital broadcast signals.

Figure 3:
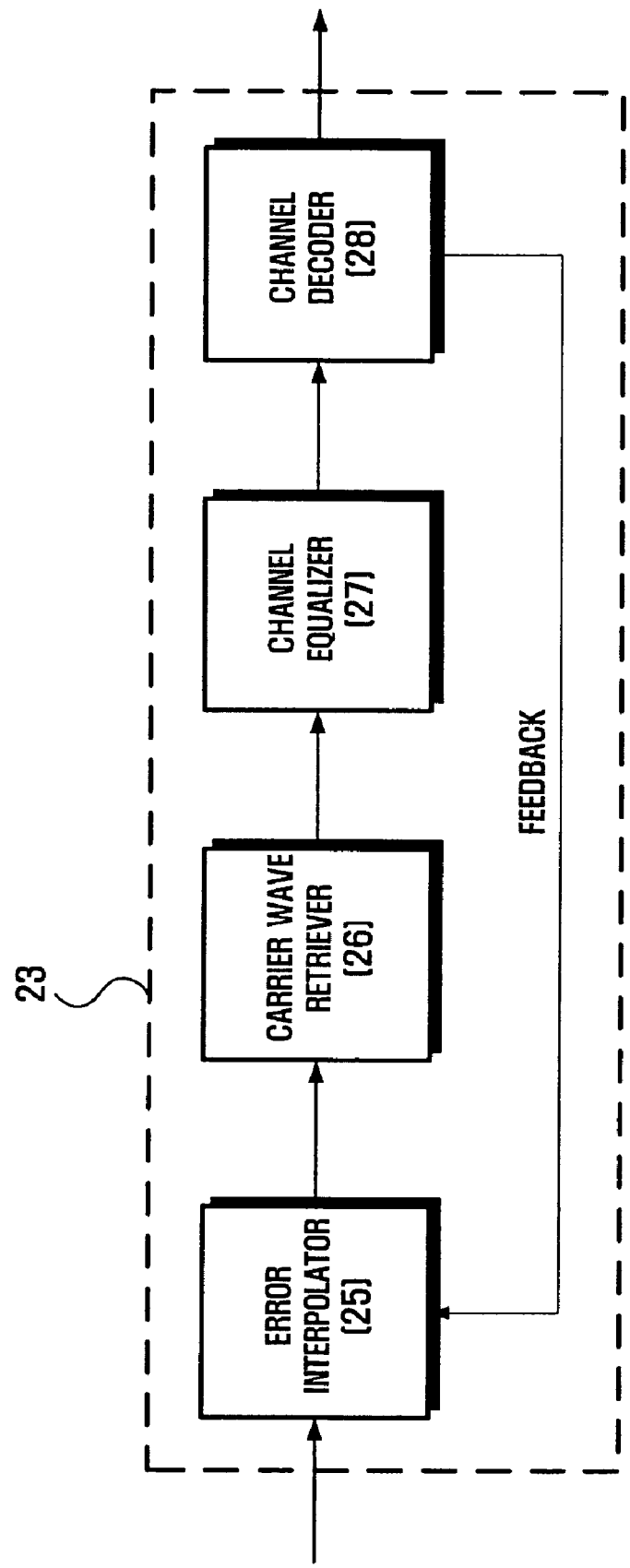
FIG. 3 is a detailed block diagram of an exemplary symbol retrieval unit.

The symbol retriever 23 outputs the retrieved symbols to devices connected to the demodulation unit 20. As illustrated in FIG. 3, the symbol retriever 23 may include an error interpolator 25, a carrier wave retriever 26, a channel equalizer 27, and a channel decoder 28.

Referring to FIG. 3, a transmission symbol timing error produced when processing a baseband digital signal (i.e., a transmission symbol timing error produced as a result of a decoding operation performed by the channel decoder 28) is fed back to the error interpolator 25.

Then, the error interpolator 25 performs an interpolation operation so that the difference between the digital signal output by the A/D converter 22 and the feedback signal received from the channel decoder 28 can be reduced, and it outputs a band pass digital signal, resulting from the interpolation, to the carrier wave retriever 26.

The carrier wave retriever 26 removes carrier wave frequency offsets and phase jitters from the band pass digital signal output by the error interpolator 25, digitally demodulates it, and outputs it to the channel equalizer 27.

The channel equalizer 27 removes inter-symbol interferences caused by multiple paths from the baseband digital signal provided by the carrier wave retriever 26, and it outputs the resultant baseband digital signal to the channel decoder 28. In other words, in a digital transmission system, such as a high-definition TV (HDTV), a signal may be distorted in the process of being transmitted via multi-path channels, there may be interference with NTSC signals, or it may be distorted by a transmission/reception system, and thus, bit errors are highly likely to occur. The transmission of a signal via multiple paths is one of the main causes of such bit errors. Therefore, the channel equalizer 27 removes the inter-symbol interferences caused by multiple paths from the baseband digital signal provided by the carrier wave retriever 26.

The channel decoder 28 removes burst noise and random noise from the resultant baseband digital signal using a Reed-Solomon coding method and a grid modulation coding method. Thereafter, the channel decoder 28 retrieves synchronized signals that may have been inserted into the noise-free baseband digital signal when the broadcast signals 5 were transmitted by a broadcasting system, and then it retrieves the received data (i.e., transmission symbols) using the synchronized signals.

It should be noted that the above detailed descriptions of the operations of the tuner 10a and the demodulator 20a are also directly applicable to the exemplary tuners 10b and 10c and the exemplary demodulators 20b and 20c.

Referring to FIG. 1, the scanning control unit 80 provides an operation command to the central processing unit 90 according to a channel scanning algorithm, using a plurality of tuners, in response to a command issued by the user. The channel scanning algorithm will be described in detail later with reference to FIGS. 4, 8, 10, and 11. The command issued by the user may be transmitted via a remote control, or a button on a front panel, or another method as would be understood by one of skill in the art.

The data retrieval unit 50 retrieves original data (e.g., video data and audio data) from a transport stream provided by the demodulation unit 20 and outputs it. The data retrieval unit 50 may include a demultiplexing unit 51, a data decoder 52, and a signal output unit 53.

The demultiplexing unit 51 demultiplexes the transport stream provided by the demodulation unit 20 into a video signal, an audio signal, or a data signal by parsing the corresponding transport stream under the control of the central processing unit 90, and provides the audio signal or the data signal to the data decoder 52.

The data decoder 52 may include a video decoder (not shown), an audio decoder (not shown), or a data parser (not shown), and it transmits the video signal, the audio signal, or the data signal provided by the demultiplexing unit 51 to the signal output unit 53. The data decoder 52 may be implemented according to a video decoding method such as MPEG-2 (Moving Picture Experts Group-2) or MPEG-4 (Moving Picture Experts Group-4), an audio decoding method such as MPEG Layer-3 (MP3) or Audio Compression 3 (AC-3), or a method of decoding regular compressed data as would be understood by one of skill in the art.

The signal output unit 53 processes the video signal, the audio signal, or the data signal and provides the processed video signal, the processed audio signal, or the processed data signal to a video output device (not shown), an audio output device (not shown), or a storage medium (not shown), respectively. For example, the data output unit 53 may use an NTSC encoder to process the video signal. In this case, the data output unit 53 decodes the video signal and outputs the decoded video signal to a video output device. Instead of the NTSC encoder, a PAL encoder may be used. In addition, the data output unit 53 may decode the audio signal using an audio decoder and a digital-to-analog (D/A) converter and output the decoded audio signal to an external audio output device. Moreover, the data output unit 53 may process the data signal and store regular data in a file in a non-volatile memory device such as a hard disc or a flash memory device so that the stored data can be executed by the central processing unit 90.

The central processing unit 90 controls the entire digital broadcast receiver 100 and may be implemented as a typical CPU. The central processing unit 90 controls the tuner unit 10, the demodulation unit 20, and the data retrieval unit 50 to perform their respective operations by transmitting a channel switch command, a channel data existence determination command, and a data parse command to the tuner unit 10, the demodulation unit 20, and the data retrieval unit 50, respectively, according to a predetermined channel scanning algorithm.

In the description of FIGS. 1 through 3, "component" means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

The present invention provides four embodiments of a channel scanning algorithm using a plurality of tuners, i.e., a sequential parallel scanning method, a frequency range allocation scanning method, a sequential serial scanning method, and a demodulation mode allocation scanning method. In the sequential parallel scanning method, a plurality of tuners are sequentially matched with a plurality of frequencies. In the frequency range allocation scanning method, an entire frequency range is divided by the number of tuners included in the digital broadcast receiver, and frequency sub-ranges resulting from the division are respectively allocated to the tuners so that the tuners can scan channels using the respective frequency sub-ranges. In the sequential serial scanning method, only one of a plurality of tuners is used to scan an entire frequency range. However, if channel data is available from one channel, another tuner is used to scan subsequent channels, thus eliminating the need to wait for information regarding the channel to be parsed and then stored. In the demodulation mode allocation scanning method, demodulation modes are allocated to a plurality of tuners, and then, the tuners scan channels in parallel each beginning from a predetermined channel.

In a channel scanning method using a plurality of tuners according to an exemplary embodiment of the present invention, "the tuners" may refer to all of a plurality of tuners included in the digital broadcast receiver 100 (Case 1) or to all of the tuners except for the tuner currently outputting a broadcast program (Case 2).

In Case 1, a channel scanning operation is carried out on the assumption that all of the tuners of the digital broadcast receiver 100 are available. Therefore, when a user attempts to carry out a channel scanning operation using a scanning menu in the middle of watching a broadcast program, the outputting of the broadcast program stops, and the digital broadcast receiver 100 enters a channel scan mode considering all of its tuners available.

On the other hand, in Case 2, all of the tuners included in the digital broadcast receiver 100 except for the tuner currently outputting a broadcast program are considered available. Thus, even when the user attempts to carry out a channel scanning operation in the middle of watching a broadcast program, the outputting of the broadcast program does not need to be stopped.

Sequential Parallel Scanning Method (First Exemplary Embodiment)

Figure 4:
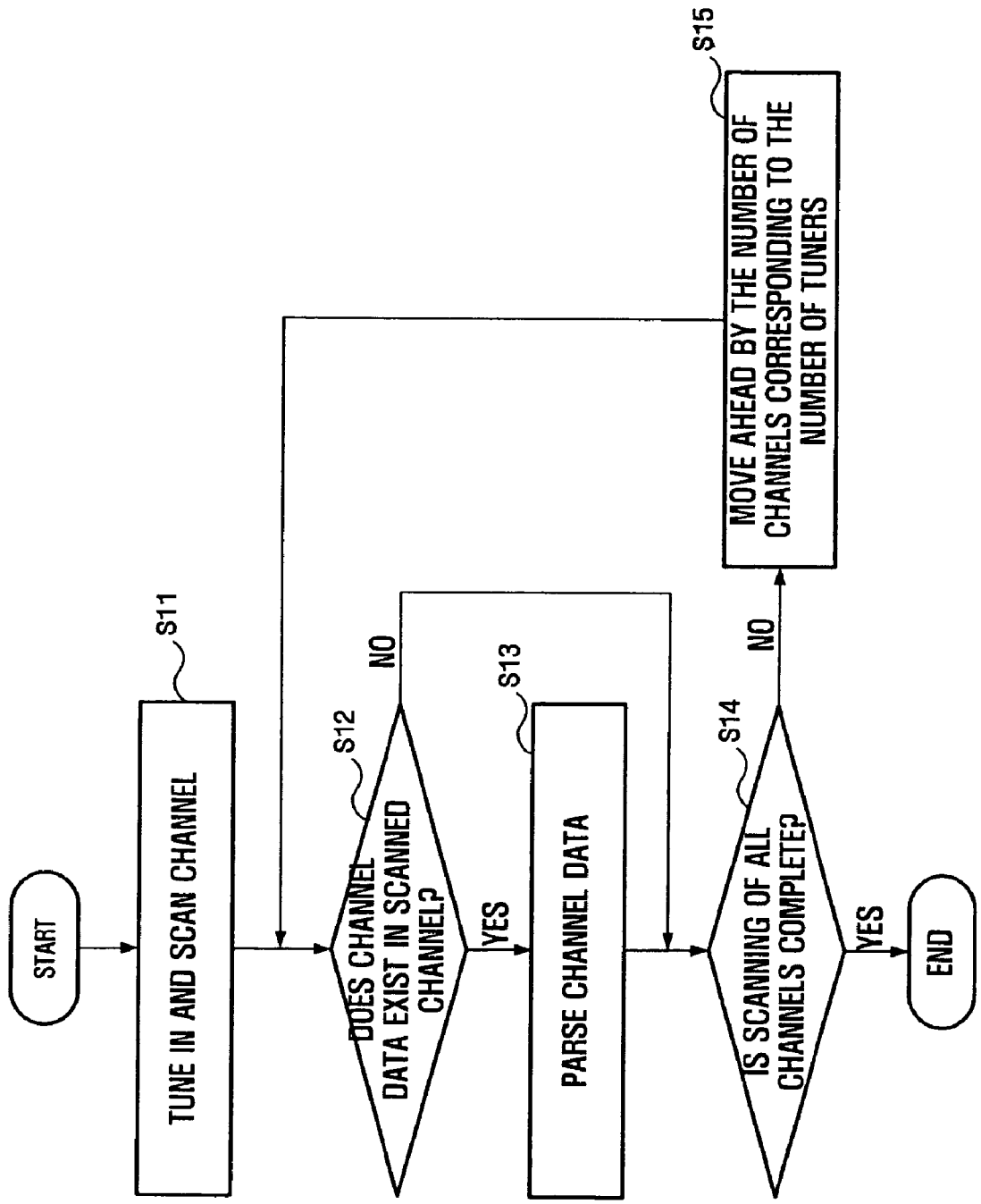
FIG. 4 is a flowchart illustrating an exemplary sequential parallel scanning method.
Figure 5:
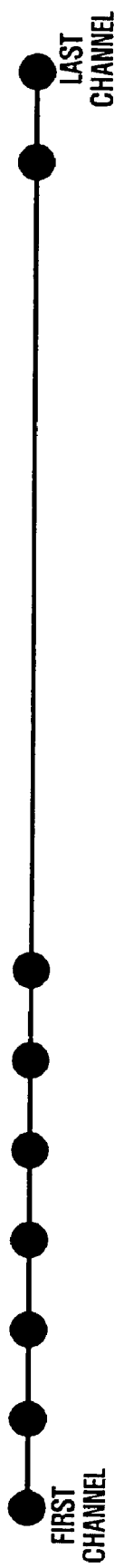
FIG. 5 is a diagram illustrating an exemplary range of channels to be scanned.

FIG. 4 is a flowchart illustrating a sequential parallel scanning method. Referring to FIGS. 1 and 4, in operation S11, each of the tuners included in the digital broadcast receiver 100 tunes in a predetermined channel (hereinafter referred to as a "beginning channel"). FIG. 5 illustrates the arrangement of channels to be scanned. Referring to FIG. 5, black dots indicate intermediate frequencies of the channels to be scanned. The beginning channel is one of the channels to be scanned first by the tuners. However, the beginning channel is not necessarily the first channel among the channels to be scanned. In other words, the beginning channel may be a channel other than the first channel.

Figure 6:
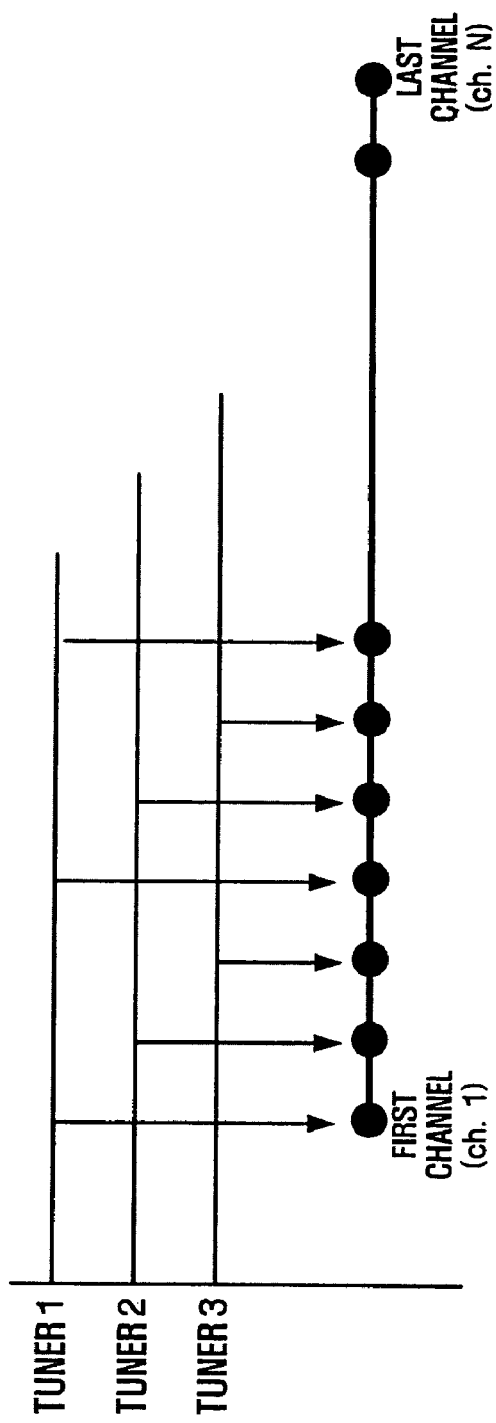
FIG. 6 is a diagram illustrating an example of the sequential parallel scanning method of FIG. 4.

FIG. 6 is a diagram illustrating the sequential parallel scanning method of FIG. 4. Referring to FIG. 6, tuners 1, 2, and 3 perform a channel scanning operation in parallel on channels 1, 2, and 3, respectively, move ahead by the number of channels corresponding to the number of tuners (3), and resume the channel scanning operation on channels 4, 5, and 6, respectively. Tuners 1, 2, and 3 start the channel scanning operation at the same time. However, the amounts of time spent by tuners 1, 2, and 3 in scanning respective channels may be different depending on whether the respective channels have channel data. Therefore, tuners 1, 2, and 3 are designed to respectively scan channels, move ahead by the number of channels corresponding to the number of tuners after scanning the channels, and then respectively scan channels subsequent channels. The amounts of time spent by tuners 1, 2, and 3 to scan empty channels may be different. The amount of time required for a tuner to scan a channel may vary depending on whether the channel contains channel data because the scanning of a channel containing channel data additionally requires the tuner to parse the channel data to obtain information regarding the channel.

Referring back to FIG. 4, in operation S12, the scanning control unit 80 determines whether channel data exists in channels currently scanned by the tuners (hereinafter referred to as current channels) using a predetermined demodulation method. If each of the tuners supports more than one demodulation method, it is determined whether channel data exists in the current channels by using each of the demodulation methods. For example, if a tuner supports both VSB-8 and QAM-64, a demodulator corresponding to the tuner is controlled so that it can be determined whether channel data exists in the channel currently scanned by the tuner using VSB-8. If a broadcast signal is detected in the channel currently scanned by the tuner, channel data is parsed. Otherwise, it is determined whether channel data exists in the channel currently scanned by the tuner by using QAM-64. In short, if a tuner supports more than one demodulation method, it may be more efficient to use the demodulation method that is most widely used to determine whether channel data exists in a channel.

If channel data is determined not to exist in the current channels in operation S12, the current channels are considered empty. In detail, in the present embodiment, if a program association table (PAT) is not detected in a channel within a predetermined period of time, the channel is considered to be empty. The determining of whether a channel is empty will be described later in further detail with reference to FIG. 7.

If channel data is determined to exist in the current channels in operation S12, in operation S13 the data retrieval unit 50 extracts basic information regarding the current channels from the channel data by parsing the channel data and stores the extracted basic information and the channel numbers together in memory (not shown). The basic information regarding the current channels indicates additional information regarding broadcast programs provided by the current channels and is specified in the Advanced Television Systems Committee (ATSC) Program and System Information Protocol (PSIP) standard (A/65B) and in a cable broadcast standard called Society of Cable Telecommunications Engineers (SCTE) 65.

In operation S14, it is determined whether the scanning of the current channels has been completed. If the scanning is complete, the entire scanning method is complete. Otherwise, the tuners are controlled to move ahead by the number of channels corresponding to the number of tuners in operation S15, and then the channel scanning method returns to operation S12.

If channel data is determined not to exist in the current channels in operation S12, the channel scanning method proceeds to operation S15.

In order to determine whether channel data exists in the current channels in operation S12, a PAT included in the transport stream may be used. The structure of a transport stream used as a protocol in digital broadcasting is illustrated in FIG. 7.

Figure 7:
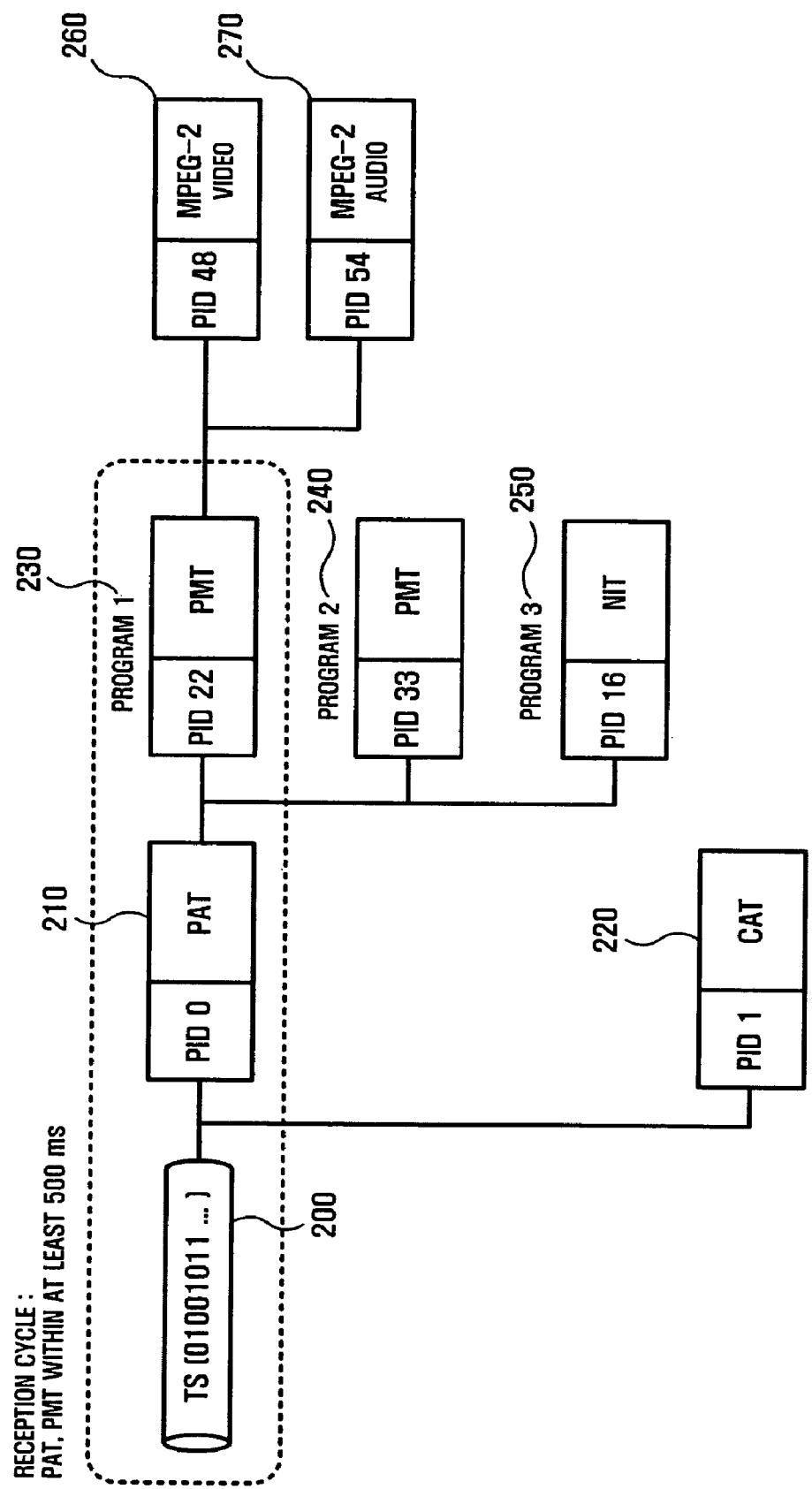
FIG. 7 is a diagram illustrating an exemplary structure of a transport stream.

Referring to FIG. 7, the transport stream 30 includes a transport packet having a fixed length of 188 bytes. The transport packet includes a packet header having a length of 4 bytes and a data field having a length of 184 bytes. The packet header contains various information, such as 8-bit synchronization information and a 13-bit packet identifier (PID).

Examples of the transport packet include a video packet 260, an audio packet 270, and a program specific information (PSI) data packet. Examples of the PSI data packet include transport packets, such as a PAT 210, a program map table (PMT) 230 or 240, which corresponds to each broadcast program, and a network information table (NIT) 250. In the case where viewing restrictions are required, for example, when providing a pay-per-view program, a transport packet, such as a conditional access table (CAT) 220, can be used. A PID is allotted to each of the transport packets 210, 220, 230, 240, 250, 260, and 270. Thus, it is possible to determine what type of data is stored in a data field of each of the transport packets 210, 220, 230, 240, 250, 260, and 270 by the respective PIDs. The PAT 210 is always given a PID of 0.

Since the PAT 210 and the PMT 230 or 240 are related to a broadcast program provided by a predetermined channel, different channels may have different PATs 210 and PMTs 230 or 240. However, broadcast programs provided by all of the channels are recorded in the NIT 250.

If the PAT 210 and the PMT 230 or 240 are not detected in a channel, it is hard to consider the channel containing channel data even though other transport packets have been received the channel. In general, the PAT 210 and the PMT 230 or 240 are received from a channel containing channel data in a predetermined time interval, and particularly, are they received within at least 500 ms of one another. One channel generally has only one PAT 210 but may have more than one PMT 230 or 240. Therefore, in the present embodiment, if the PAT 210 is not detected in a channel within 500 ms from the time when channel scanning begins, the central processing unit 90 considers the channel is empty. Otherwise, the central processing unit 90 considers the channel as containing a broadcast signal. However, the present invention is not restricted to using the PAT 210 to determine whether a channel is empty. It should be noted that a demodulation method other than those set forth herein can be used to determine whether a channel contains a broadcast signal. In addition, it should also be noted that the critical time used to determine whether a channel contains channel data may be set to be other than 500 ms.

Frequency Range Allocation Scanning Method (Second Exemplary Embodiment)

Figure 8:
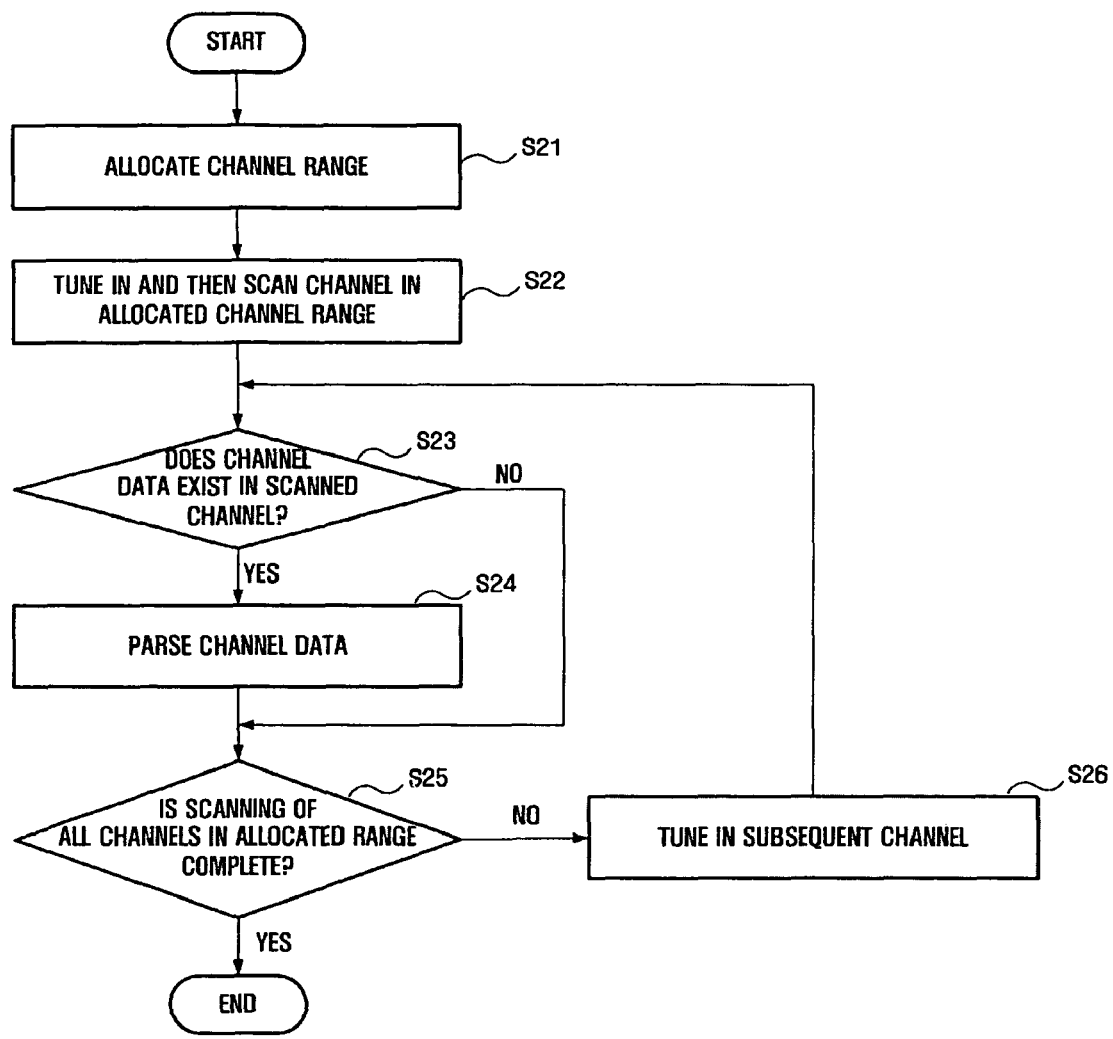
FIG. 8 is a flowchart illustrating an exemplary frequency range allocation scanning method.

FIG. 8 is a flowchart illustrating a frequency range allocation scanning method. Referring to FIGS. 1 and 8, in operation S21, the scanning control unit 80 allocates ranges of channels to a plurality of tuners. The channel ranges allocated to the tuners may be the same size. The allocation of the channel ranges does not need to be carried out whenever a channel scan command is issued by a user. Once the channel ranges are allocated to the tuners, the tuners can scan channels without the need to change their settings.

Figure 9:
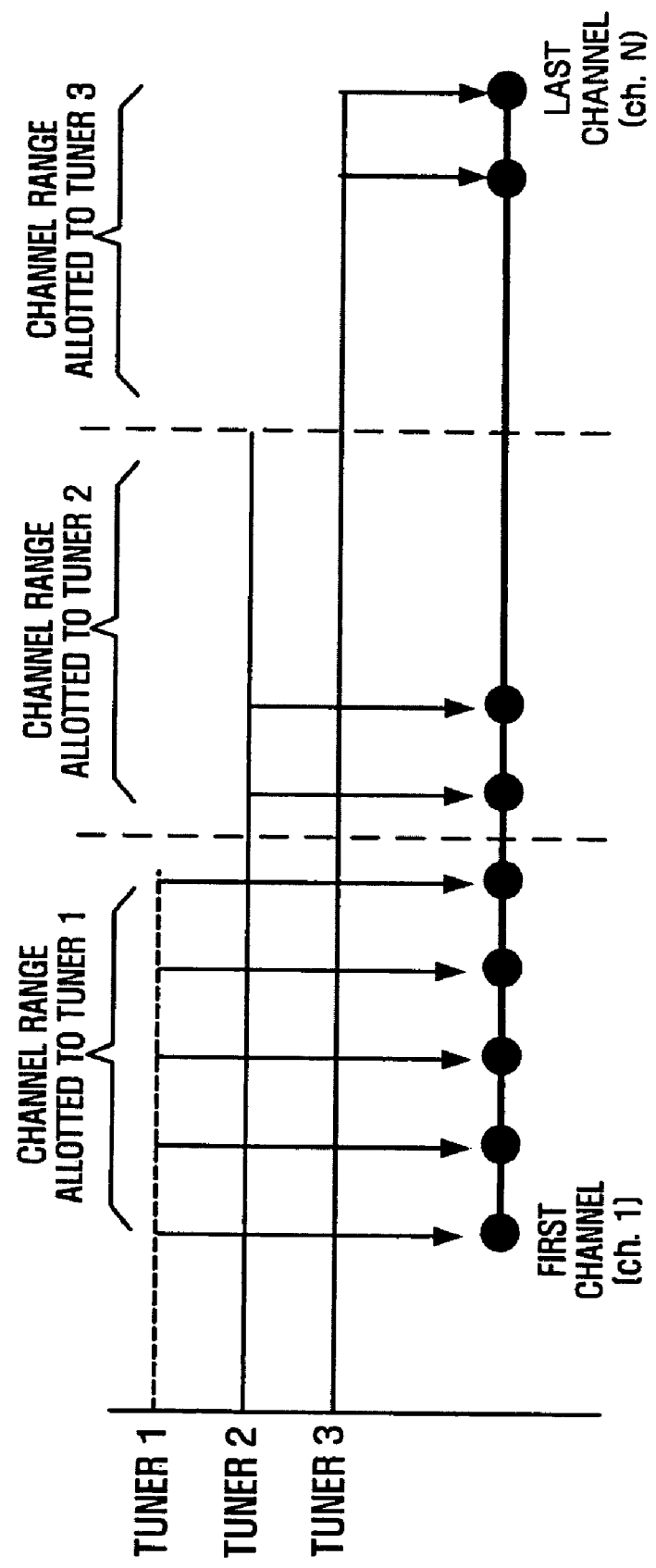
FIG. 9 is a diagram illustrating operation 821 of FIG. 8, i.e., the allocation of a plurality of channel ranges to a plurality of tuners.

In operation S22, the tuners are tuned to predetermined channels (hereinafter referred to as beginning channels) of the respective channel ranges. FIG. 9 is a diagram illustrating the allocation of channel ranges to tuners. The channel ranges allocated to the tuners in operation S21 may be consecutive groups of channels, or they may be groups of channels separate from one another. In addition, the channel ranges allocated to the respective tuners may be or may not be the same size.

In operation S22, the beginning channels may be the first channels of the respective channel ranges. However, in the present embodiment, unlike in the previous embodiment, the beginning channels may be other than the first channels of the respective channel ranges.

In operation S23, the scanning control unit 80 determines whether the beginning channels contain channel data. In the present embodiment, like in the previous embodiment, if each of the tuners supports more than one demodulation method, the scanning control unit 80 needs to determine whether the beginning channels contain channel data by using each of the demodulation methods supported by each of the tuners. In addition, in the present embodiment, like in the previous embodiment, it may be determined whether the beginning channels contain channel data by using a PAT.

In operation S24, if channel data is determined to exist in the beginning channels in operation S23, the data retrieval unit 50 extracts basic information regarding the beginning channels from the channel data by parsing the channel data and stores the extracted basic information and the channel numbers together in memory (not shown).

If the scanning of all of the channels in the channel ranges allocated to the tuners is determined to be complete in operation S25, the entire scanning method is complete. Otherwise, the tuners tune in channels subsequent to the respective beginning channels in operation S26, and then the scanning method returns to operation S23.

If channel data is determined not to exist in the beginning channels in operation S23, the scanning method proceeds to operation S25.

Sequential Serial Scanning Method (Third Exemplary Embodiment)

Figure 10:
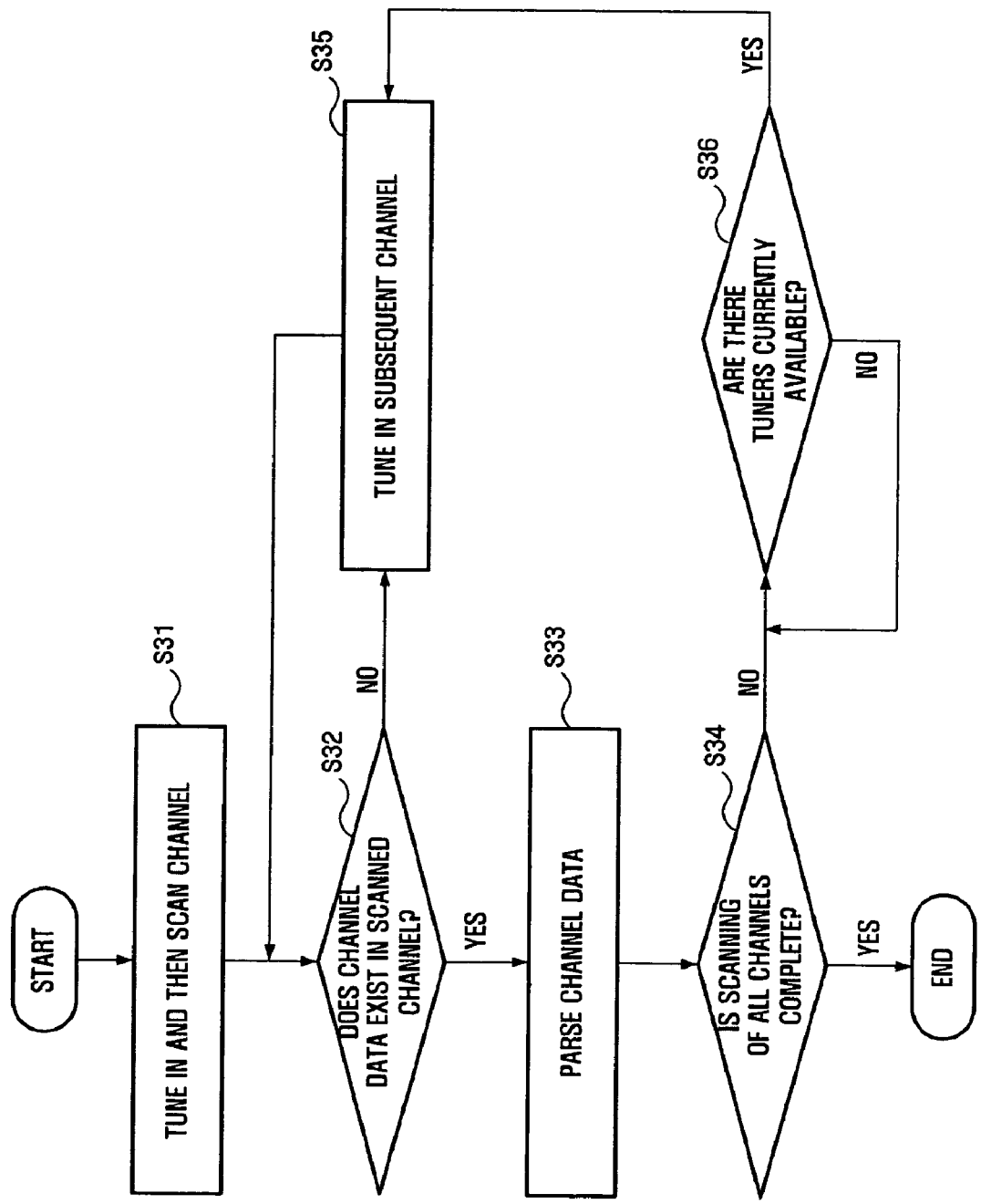
FIG. 10 is a flowchart illustrating an exemplary sequential serial scanning method.

FIG. 10 is a flowchart illustrating a sequential serial scanning method. In the sequential serial scanning method, one tuner is controlled to scan channels. If channel data is determined to exist in one of the scanned channels, another tuner is controlled to scan channels subsequent to this channel, and thus, the need to wait for the channel data to be parsed is eliminated.

Referring to FIG. 10, in operation S31, one of a plurality of tuners in the digital broadcast receiver 100 (hereinafter referred to as a current tuner) is tuned to a channel (hereinafter referred to as a beginning channel) of a predetermined channel range.

In operation S32, the scanning control unit 80 determines whether a broadcast signal, i.e., channel data, exists in the beginning channel.

If channel data is determined to exist in the beginning channel (if yes in operation S32), the data retrieval unit 50 extracts basic information regarding the beginning channel from the channel data by parsing the channel data and stores the extracted basic information and the channel number together in memory (not shown) in operation S33.

Thereafter, in operations S34 and S35, another available tuner, other than the current tuner, tunes in and then scans a channel subsequent to the beginning channel. In detail, if the scanning of all of a plurality of channels in a predetermined channel range is determined not to be complete in operation S34, the scanning control unit 80 determines whether there are tuners currently available in the digital broadcast receiver 100 in operation S36. If none of the tuners in the digital broadcast receiver 100 are determined to be available (if no in operation S36), the scanning control unit 80 waits until a tuners in the digital broadcast receiver 100 becomes available. If it is determined that a tuner is available (if yes in operation S36), the tuner is controlled to tune in the channel subsequent to the beginning channel in operation S35, and then the scanning method returns to operation S32.

If channel data is determined not to exist in the beginning channel, the current tuner is tuned to the channel subsequent to the beginning channel, and the scanning method returns to operation S32.

Demodulation Mode Allocation Scanning Method (Fourth Exemplary Embodiment)

Figure 11:
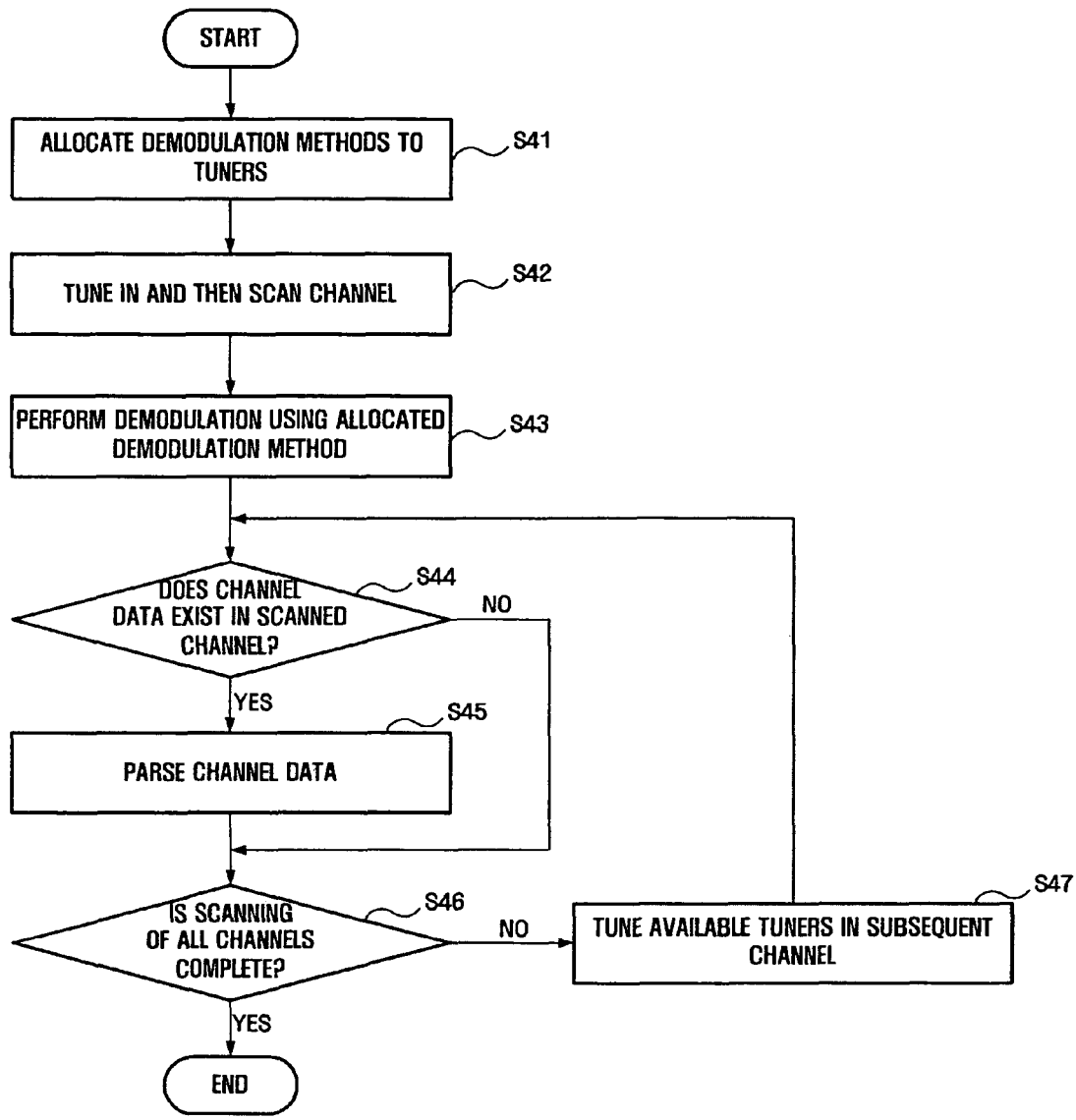
FIG. 11 is a flowchart illustrating an exemplary demodulation mode allocation scanning method.

FIG. 11 is a flowchart illustrating a demodulation mode allocation scanning method. In the demodulation mode allocation scanning method, a plurality of demodulation methods may be allocated to a plurality of tuners included in the digital broadcast receiver 100, and then the tuners scan channels using the respective demodulation methods to obtain channel data. Here, when scanning the channels, all the tuners may begin from the same channel or each of the tuners may begin from a different channel.

Suppose that a digital broadcast receiver includes tuners A, B, C, and D, and each of tuners supports VSB-8, QAM-64, and QAM-256. In the demodulation mode allocation scanning method, a plurality of demodulation methods may be allocated to tuners A, B, C, and D. For example, VSB-8 is allocated to tuners A and B, QAM-64 is allocated to tuner C, and QAM-256 is allocated to tuner D. When allocating a plurality of demodulation methods to tuners A, B, C, and D, information regarding which of the demodulation methods is most widely used or least widely used may be taken into consideration.

If the same demodulation method is allocated to a plurality of tuners, as described above, the tuners may scan channels using any of the scanning methods according to the first through third embodiments of the present invention.

Referring to FIG. 11, in operation S41, the scanning control unit 80 allocates a plurality of demodulation methods to a plurality of tuners. The allocation of the demodulation methods does not need to be carried out whenever a channel scan command is issued by a user. In other words, once the demodulation methods are set, the tuners can scan channels afterwards without the need to change the settings.

In operation S42, the tuners are tuned in to the same channel or different channels (hereinafter referred to as a current channel or current channels). Preferably, the tuners are tuned in to the same channel if it is the beginning of a channel scanning operation. However, the tuners may be tuned to different channels from the very beginning of the channel scanning operation.

In operation S43, the scanning control unit 80 carries out a demodulation operation by using a plurality of demodulators respectively corresponding to the tuners.

In operation S44, the scanning control unit 80 determines whether channel data exists in the current channel(s). In operation S45, if channel data is determined to exist in the current channel(s) (if yes in operation S44), the data retrieval unit 50 extracts basic information regarding the current channel(s) from the channel data by parsing the channel data and then stores the extracted basic information and the channel number(s) together in memory (not shown)

If the scanning of the channels in a predetermined channel range is determined to be complete in operation S46, the entire scanning method is complete. If the scanning of the channels is not complete, in operation S47 the tuners are tuned to a channel or channels subsequent to the current channel(s) on a first come, first served basis as soon as they finish the scanning of the current channel(s), and then the scanning method returns to operation S44.

If channel data is determined not to exist in the channel(s) scanned by the tuners in operation S44, the scanning method proceeds to operation S46.

According to the present invention, it is possible to quickly perform a channel scanning operation using a digital broadcast receiver having a plurality of tuners.

In addition, if each of the tuners provides a plurality of demodulation methods, it is possible to quickly perform channel scanning of an entire channel range.

Further, a user can easily obtain serial numbers and information of a plurality of channels without the aid of an electronic program guide (EPG).

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A channel scanning method performed by a tuner processor of a digital broadcast receiver having a plurality of tuner processors, the method comprising:
    determining, by each tuner processor, whether channel data exists in a channel;
    if channel data exists in the channel, parsing the channel data and storing information regarding the channel obtained by parsing the channel data; and
    moving ahead by a number of channels equal to the number of tuner processors included in the digital broadcast receiver from a tuner processor whose channel data parsing and information storing is completed;
    wherein a channel in which each tuner processor performs channel scanning among all channels to be scanned is determined after tuning a scanning start channel in which each tuner processor initially performs channel scanning.

2. The channel scanning method of claim 1, wherein the determining whether channel data exists in a channel comprises determining whether a program association table is detected in the channel within a predetermined amount of time.

3. The channel scanning method of claim 2, wherein said predetermined amount of time is 500 ms.

4. The channel scanning method of claim 1, wherein the storing information comprises:
    extracting basic information regarding the channel by parsing the channel data; and
    storing the extracted basic information together with a serial number of the channel.

5. The channel scanning method of claim 1, wherein the information regarding the channel complies with the Program and System Information Protocol (PSIP).

6. The channel scanning method of claim 1, wherein none of the plurality of tuner processors perform the steps of determining, storing, and moving ahead while receiving a broadcast program being watched by a user.

7. The channel scanning method of claim 1, wherein said determining, by each tuner processor, whether channel data exists in a channel further comprises determining whether a program association table and a program map table are detected in the channel within a predetermined amount of time.

8. The channel scanning method of claim 7, wherein said predetermined amount of time is 500 ms.

9. A channel scanning method performed by a digital broadcast receiver having a plurality of tuner processors, the method comprising:
(a) allocating a plurality of demodulation methods to the plurality of tuner processors;
(b) determining, by said tuner processors, whether channel data exists in a channel by using each of the demodulation methods allocated to the tuner processors;
(c) if channel data is determined to exist in a channel, parsing the channel data and storing information regarding the channel, for which channel data is determined to exist, obtained by parsing the channel data; and
(d) tuning the tuner processors to channels subsequent to the current channels;
wherein, if a single demodulation method is allocated to two or more tuner processors, steps (b), (c), and (d) for the two or more tuner processors comprise:
in each of the two or more tuner processors:
determining whether channel data exists in a channel,
if channel data exists in the channel, parsing the channel data and storing information regarding the channel obtained by parsing the channel data, and
moving ahead by a number of channels equal to the number of tuner processors to which the single demodulation method is allocated from the tuner processor whose channel data parsing and information storing is completed;
wherein a channel in which each tuner processor performs channel scanning among all channels to be scanned is determined after tuning a scanning start channel in which each tuner processor initially performs channel scanning.

* * * * *